Jan. 16, 1940.　　　W. E. SYKES　　　2,187,062
GEAR GRINDING MACHINE
Filed Dec. 4, 1937　　　9 Sheets-Sheet 1

INVENTOR
William E. Sykes
BY Albert R. Henry
ATTORNEY

Jan. 16, 1940.  W. E. SYKES  2,187,062
GEAR GRINDING MACHINE
Filed Dec. 4, 1937  9 Sheets-Sheet 6

Inventor
William E. Sykes
Albert R. Henry
Attorney

Jan. 16, 1940.  W. E. SYKES  2,187,062
GEAR GRINDING MACHINE
Filed Dec. 4, 1937  9 Sheets-Sheet 7

Inventor
*William E. Sykes*

Albert R. Henry
Attorney

Jan. 16, 1940. W. E. SYKES 2,187,062
GEAR GRINDING MACHINE
Filed Dec. 4, 1937 9 Sheets-Sheet 9

Inventor
William E. Sykes
Albert R. Henry
Attorney

Patented Jan. 16, 1940

2,187,062

UNITED STATES PATENT OFFICE 2,187,062

GEAR GRINDING MACHINE

William E. Sykes, Buffalo, N. Y.

Application December 4, 1937, Serial No. 178,023

6 Claims. (Cl. 51—56)

This invention relates to a machine for finishing the teeth of gears, gear cutters, and the like, and it has particular reference to a machine operating on the generating principle and adapted to grind a wide variety of types and sizes of teeth to the desired involute form with a high degree of accuracy.

To this end, the machine of the present invention includes the following general parts and combinations of parts, the preferred forms of which will be more fully described hereinafter with reference to the accompanying drawings. First, a means for mounting a tool such as a grinding wheel for reciprocating movement in a lineal path. Second, means for mounting the work for oscillatory movement through an arc commensurate with the length of the surface to be finished, and effecting a timed relation between the motion of the tool and the motion of the work, to cause a tooth of the work and tool to contact through the desired curve to be generated. Third, means operable while the tool is removed from the work to advance or index the work, so that, upon a subsequent stroke, the tool will finish a new tooth. Such means, as hereinafter more fully described, includes an indexing mechanism which rotates the work one-half the distance between teeth while the tool recedes from the work, and the other half of the distance while the tool advances toward the work, thus reducing the inoperative or lost motion phase of the tool movement to half the time which otherwise would be required. Fourth, the provision of improved means for mounting the tool so that it may be correctly positioned to contact teeth of different pitches or shapes. Fifth, the provision of improved indexing means whereby an accurate adjustment and coordinated movement of the tool and work may be obtained.

While it is intended that the foregoing features of the invention may be used in conjunction with each other, it will also be understood that, as pointed out in several of the appended claims, they may on occasion be used in other relationships, and therefore it will be understood that the following description is intended to exemplify, rather than limit, the invention as hereinafter claimed.

The machine includes a base 25 having ways 26, 27, 28 for receiving a main grinding wheel carriage 30, which is formed with cooperating slides 31, 32, 33. The carriage 30 carries a multiplicity of adjustable mechanisms for accurately positioning a motor driven grinding wheel G with reference to the work piece C, which may be a gear cutter or other toothed device. (Figs. 1 to 5.)

The right hand extremity of the base 25 (Figs. 1 and 18) is formed with a bracket portion 35 to which is secured a motor 36 and a connected reducing gear unit 37, which contains a suitable gear mechanism for causing the slow rotation of a crankshaft 39. The shaft 39 is formed with a plate 40 containing T-slots 41, and it receives a slide 42 which is adjustably secured by T-bolts
43. The slide 42 carries a crank pin 44, which is received in one end of a connecting rod 45. The remaining end of the rod 45 is connected to the main carriage by means of a pin 46 mounted in a bracket 47, which in turn is secured to the carriage 30. The throw of the crankshaft and the associated reciprocatory movement of the carriage 30 may thus be varied to suit the nature of the grinding operation.

The base 25 is provided with a laterally projecting portion 50 which serves as a mounting base for a rigidly secured headstock unit 48. The unit includes a rotatable work spindle 51 and a pulley 52, which is connected to the shaft through an automatic indexing mechanism 53, as will presently be more completely described.

Figure 1:
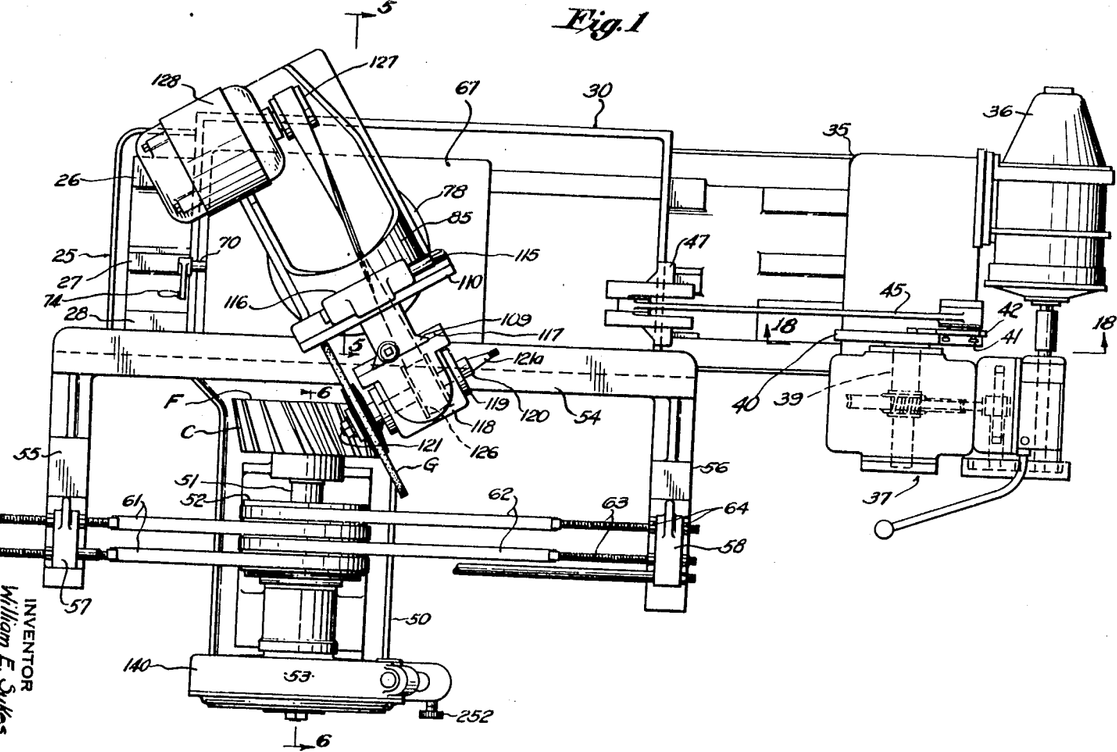
Fig. 1 is a top view of the machine which is set up to grind a helical cutter.
Figures 4, 18:
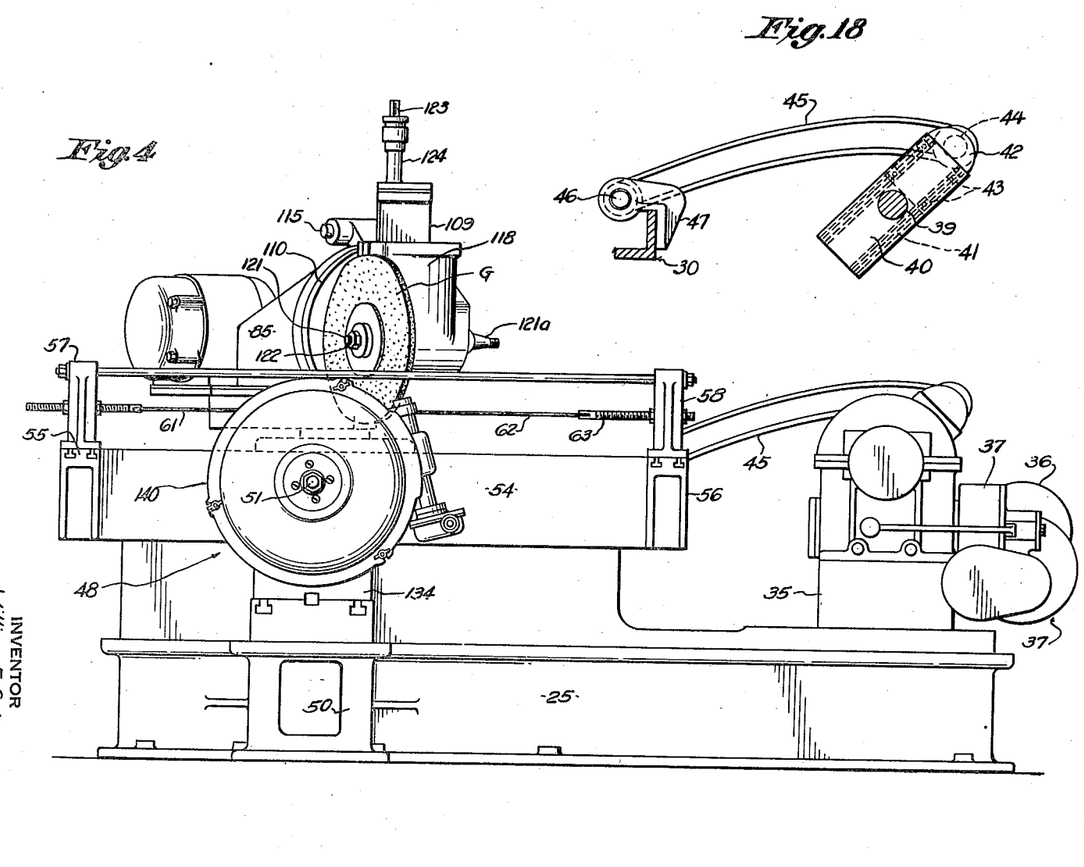
Fig. 4 is a front view of the machine as organized in Fig. 1.
Fig. 18 is a section on the line 18—18 of Fig. 1, showing the main carriage crank mechanism.
Figure 6:
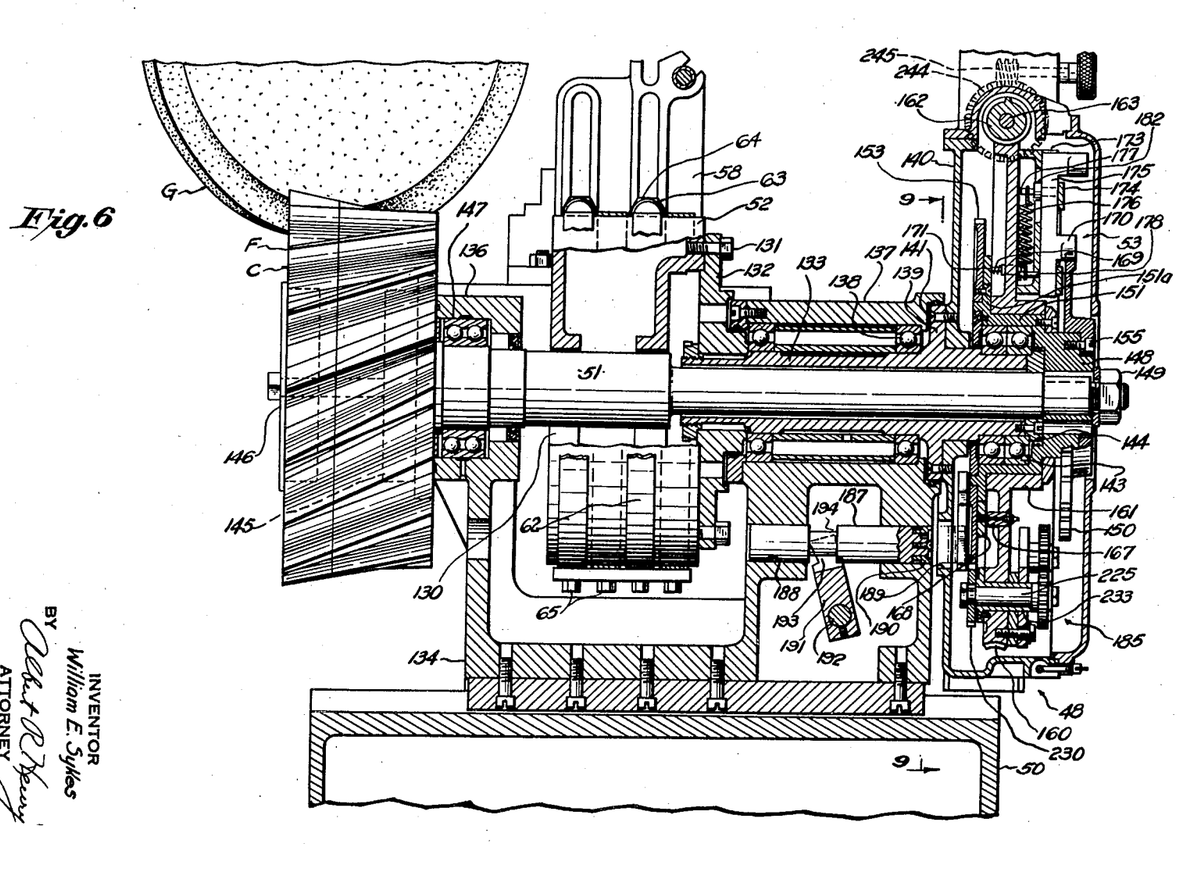
Fig. 6 is an enlarged section through the headstock taken on the line 6—6 of Fig. 1.

The pulley 52 and accompanying work spindle 51 are oscillated in timed relation to the reciprocation of the carriage 30 through a direct driving connection (Figs. 1 and 4). A channel member 54 is secured to the front face of the carriage 30 and it is formed with spaced projecting arms 55, 56, on which vertically slotted pedestals 57, 58 are mounted in aligned relation. Bands 61, 62 are secured to the pedestals 57, 58, respectively, by attached screws 63 which are secured to the slotted portions of the pedestals by nuts 64. The free ends of the bands are wrapped about the pulley 52 and secured by screws 65 (Fig. 6). When properly positioned and tensioned, the bands provide an extremely effective connection which transforms the lineal reciprocatory movement of the carriage into alternate clockwise and counter-clockwise rotation of the pulley 52. The work piece or cutter C is secured to the end of the work spindle 51, and the grinding wheel G is correctly positioned so that it contacts one side of a tooth of the cutter during the cycle of movement of the carriage 30.

The various adjustable mechanisms carried by the carriage are utilized to bring the wheel G into proper grinding relation with the teeth of the work piece, which may be of helical or straight formation. The stroke of the carriage 30 may be varied in accordance with the diameter and tooth depth of the work piece by stroke adjustment of the crankshaft 39 through its movable slide 42, so that the wheel G travels a sufficient distance to grind the entire face and flank of a tooth of the rotating work piece.

The longitudinal positioning of the supporting structure of the grinding wheel on the carriage 30 is controlled by a slide 67 (Figs. 3 and 5) which is provided with gib portions 68, 69, which engage longitudinally extending ways 71 formed on the upper surface of the carriage 30. The slide 67 is formed with a nut portion 72 (Fig. 3) for receiving an adjusting screw 70 which extends through a bearing 73 on the carriage and is operated by an adjusting crank 74. The entire supporting structure of the grinding wheel may thus be shifted on the main carriage 30 to bring the grinding wheel into a centralized position relative to its stroke and to the underlying work piece C.

The supporting structure may be moved to any desired angular position about a vertical axis in order that the face of the wheel G may be given the proper angle for grinding helical or straight teeth. The longitudinal slide 67 is provided with a circular head 75 formed with a concentric T-slot 76 for receiving T-bolts 77. A complementary swivel head 78 is rotatably mounted on the head 75 and it is provided with suitable holes 79 for receiving the ends of the bolts 77. Nuts 81 on the bolts 77 permit the heads 75 and 78 to be clamped together at any desired rotative position.

Figure 5:
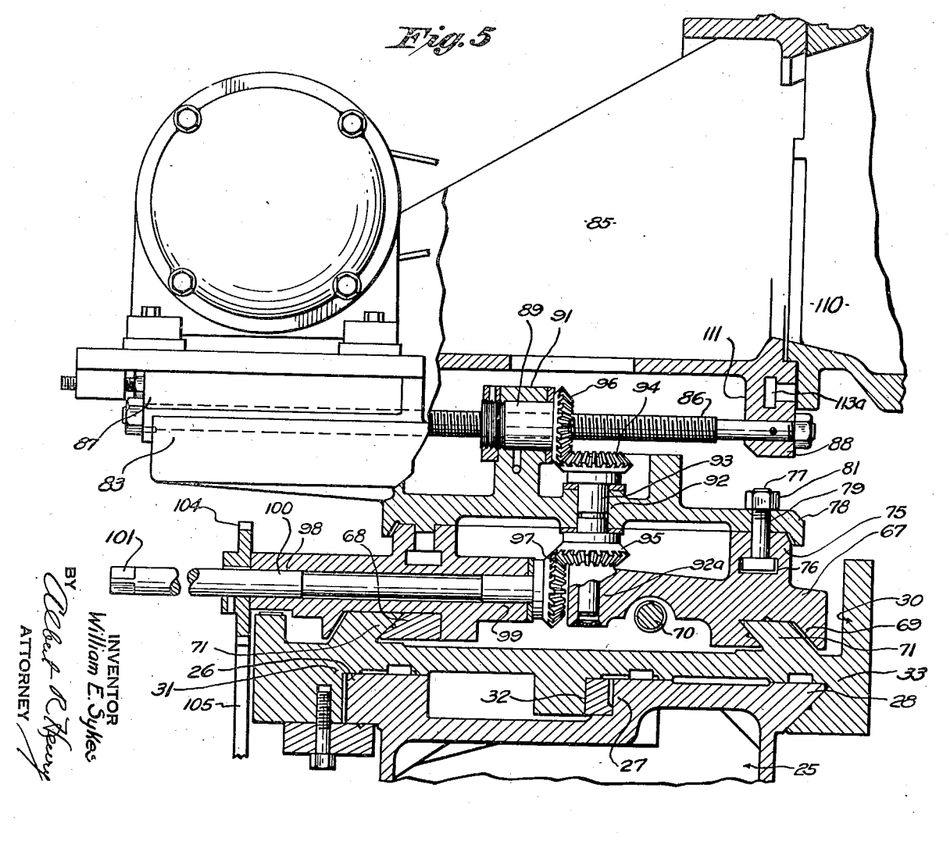
Fig. 5 is an enlarged section on the line 5—5 of Fig. 1 showing the longitudinal swivel slide and associated adjustable mechanism which supports the lateral grinding wheel carriage.

Horizontal ways 83 form part of the swivel head structure, and they receive the gib portions 85a of a cross carriage 85. A screw 86 is fixed in bosses 87, 88 of the carriage 85, and it receives a nut 89 which is rotatably carried in a bearing 91, forming part of the underlying swivel head 78. The swivel head 78 and slide head 75 are formed with aligned axial bearings 92, 92a for a countershaft 93 on which are secured bevel gears 94, 95. The gear 94 meshes with a bevel gear 96 forming part of the nut 89, while the gear 95 engages a bevel gear 97, which is secured to a lateral adjusting shaft 100, carried in bearings 98, 99 in the slide 67 (Fig. 5).

Figures 2, 17:
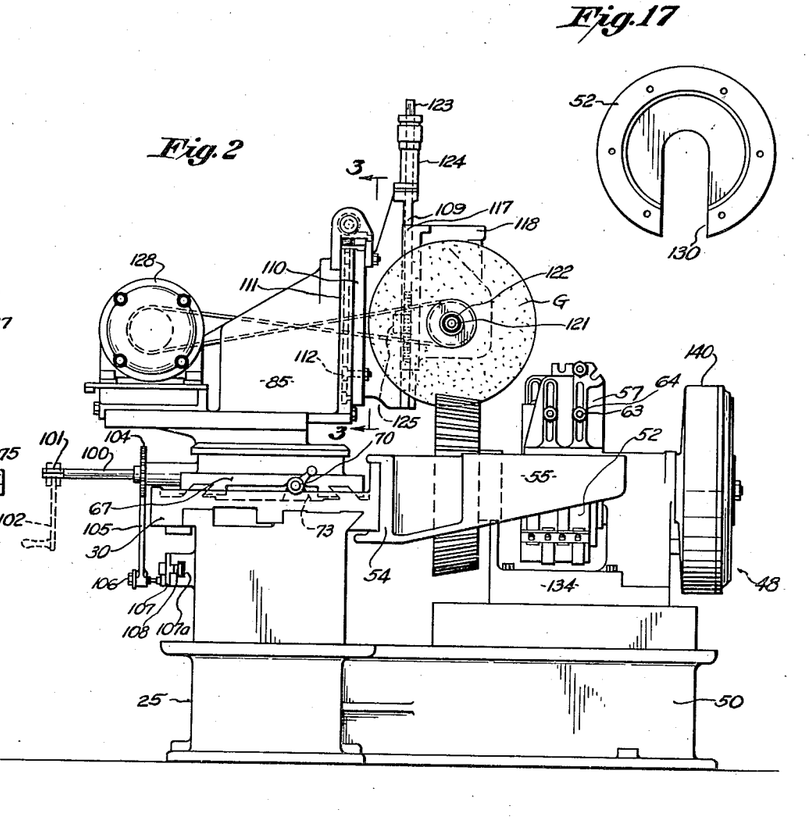
Fig. 2 is an end view thereof with the grinding wheel positioned to grind a straight tooth cutter.
Fig. 17 is a front view of the band pulley.
Figure 3:
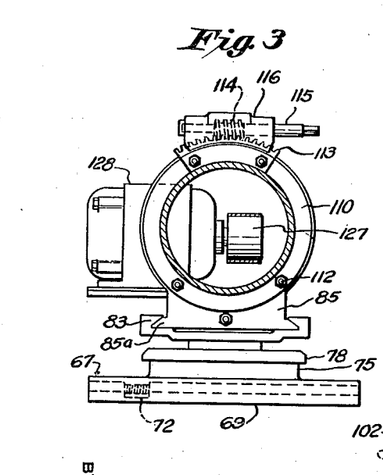
Fig. 3 is a section on the line 3—3 of Fig. 2 showing the radial adjusting mechanism of the cutter head.

The projecting extremity of the shaft 100 is formed with a squared portion 101 for receiving a crank 102 which may be operated to move the cross carriage 85 along the ways 83 of the swivel head 78. A ratchet 104 is secured to the shaft 100 and it is engageable with a pawl 105 which is carried by a stud 106 secured to a pawl carriage 107 (Fig. 2). The pawl carriage is slidably positioned in a T-slot way 107a forming part of the base 25, and it is secured thereto by a bolt 108.

Vertifical inclination of the grinding wheel face with reference to the teeth of the work piece is obtained through adjustment of a horizontal swivel head 110 on a circular head portion 111 formed on the extremity of the cross carriage 85. These elements are clamped together by T-bolts 112 positioned in a circular T-slot 113a in the head portion 111 and extending through suitable holes in the horizontal swivel head 110. A segment gear 113 is secured to the head 110, and it is engaged by an adjusting worm 114 whose shaft 115 is journalled in a bearing member 116 which is fastened to the head portion 111. The clamping bolts 112 may be loosened to permit operation of the shaft 115 and the adjustment of the head 110 about a horizontal axis.

The head 110 is provided with ways 109 which receive the gib portion 117 of a wheel saddle 118 which is formed with spaced bearing portions 119 disposed on a transverse axis relative to the ways 109. A wheel shaft 120 is mounted in the bearing portions 119 and it is formed with tapered spindle portions 121, 121a. The grinding wheel G, as shown in the drawings, is secured to the right hand spindle portion 121 by a lock nut 122.

An adjusting screw 123 is mounted in a bearing 124 in the horizontal head 110, and it engages a nut portion 125 formed on the wheel saddle 118. This screw permits the wheel saddle 118 and accompanying wheel to be raised or lowered to proper depth engagement with the teeth of the work piece. The wheel shaft 120 carries a pulley 126 which is connected by a suitable belt to the pulley 127 of the wheel motor 128. The motor 128 is secured to the cross carriage 85.

From the foregoing, it will be apparent that with the aid of the various adjustable supporting structures, the grinding wheel may be adjusted in three dimensions on its main carriage 30; that is, longitudinally, transversely, and vertically. In addition, the two swivel head assemblies permit the wheel face to be disposed in any desired vertical and/or horizontal angular position. The former, or special adjustments permit the grinding wheel to be brought into registry with work pieces of any diameter, while the angular adjustments permit the wheel to be set to the pressure and helix angles dictated by the tooth formation of the work piece.

The machine is especially adapted to grind the teeth of large cutters of the type shown, in which the rotating grinding wheel G may be rigidly fixed in an accurately adjusted position with reference to its main carriage 30. The duty of the grinding wheel for this type of work consists in properly molding the profile of the cutter teeth for a short space adjacent the cutting face F of the cutter. In other clases of grinding work where the entire width of gear teeth, for example, must be ground, the cross carriage may be moved through the ratchet feed to cause the wheel G to move in small increments across the face of the work.

Indexing mechanism

The pulley or drum 52 is slotted, as indicated by the numeral 130, to permit its removal from the headstock assembly without disturbing the spindle 51 (Fig. 17). The pulley is secured by screws 131 to a flanged member 132, which in turn is keyed to one end of a hollow drum shaft 133 which encompasses the spindle 51 (Fig. 6). A pedestal 134 is secured to the base portion 50, and it is provided with spaced bearing portions 136, 137, the latter of which contains ball bearings 138 for rotatably supporting the drum shaft 133. The right hand portion of the drum shaft is formed with a flange 139 to which a cylindrical index unit housing 140 is rigidly secured by screws 141. The outer extremity of the shaft 133 is shouldered to receive ball bearings 143 which are secured by an affixed retainer 144.

The work spindle 51 is formed with an enlarged arbor portion 145, to which the work piece C is clamped by a suitable locking device 146. The spindle is rotatably mounted in a ball bearing 147 located in the bearing portion 136 of the pedestal 134, and thence it loosely projects through the drum 52 and the hollow drum shaft 133. An adapter 148 is keyed to the extremity of the spindle, and it is retained by a nut 149 which engages the threaded end of the spindle. The adapter is formed with a cylindrical projection 151 which receives the ball bearings 143 of the drum shaft 133. A gear 153 is secured to a radial flange 151a on the rear of the projection 151, while the front end of the adapter is shouldered to receive an index plate or anchor wheel 150 which is secured by screws 155.

The work spindle 51 and the described parts which are rigidly secured to it are thus mounted for rotation independently of the drum shaft 133 and accompanying index unit housing 140. The indexing mechanism, which first couples these independent units and then causes their controlled relative movement during each oscillatory cycle of the drum, will now be described.

A large worm wheel 160, whose body 159 serves as a mounting plate for the various indexing instrumentalities, is formed with a hub 161 which is rotatably mounted on the projection 151 of the adapter 148. A worm 162 is secured to a shaft 163 mounted in bearings 164, 165 in the rim of the housing 140. The worm meshes with the worm wheel 160, and, during the normal grinding operation of the machine, it in effect keys the wheel for movement with the housing 140. In setting up the machine, the worm serves as an adjusting means in a manner which will be discussed later.

The wheel body 159 carries on its rear face spaced guide pins 167, which are slidably received in suitable holes in an annular friction plate 168. Springs 169 mounted on pins 171 retain the plate in frictional contact with the face of the large adapter gear 153, so that when the work spindle and drum shaft assemblies are momentarily disconnected, as occurs during each oscillation, sufficient frictional contact is provided to prevent lag or over-run, which may be caused by inertia effects.

A guide member 173 is secured to the front face of the wheel body 159, and it is formed with a gib portion 174 for receiving a plunger slide 175. A tooth 170 projecting from the slide 175 is adapted to enter one of the notches 150a of the anchor wheel 150. A spring 176, extended between pins 177, 178, on the slide 175 and guide member 173, respectively, retains the tooth 170 in engagement with one of the notches 150a. Removal of the tooth 170 is controlled by a lever 179 (Fig. 8) having one end engageable with a roller 182 carried on the slide pin 177. A connecting rod 180 is connected to the lever 179 by a stud 184 and it extends to an indexing transmission 185 for timed operation with the indexing movement when it is thrust upward to move the lever 179 and thus disengage the slide tooth 170 from the anchor wheel 150.

Figure 7:
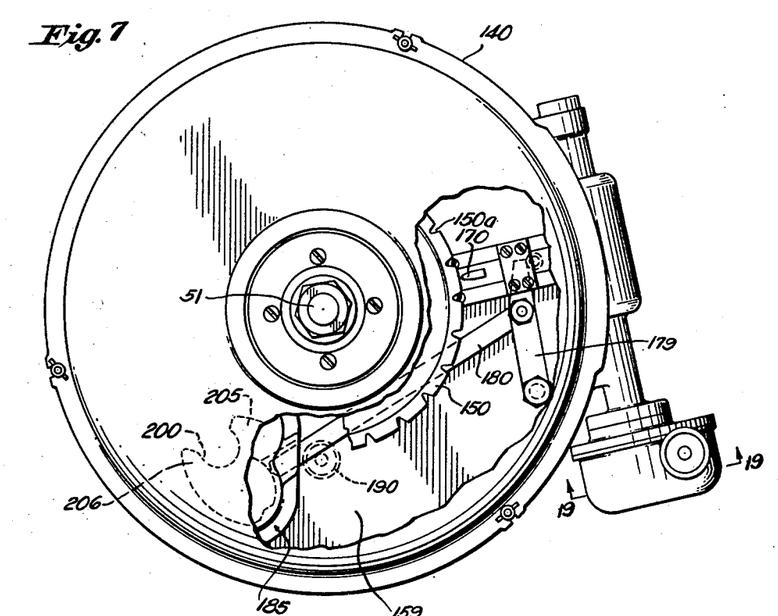
Figs. 7 and 8 are enlarged front views of the index head in positions at the end of the clockwise and counter-clockwise movements, respectively. Portions of these views are broken away or sectioned to show underlying mechanism.

In the present machine arrangement, the indexing movement is instituted near the end of the clockwise movement and continues during an equal arcuate movement on the return or counterclockwise movement of the index housing. As shown in Fig. 7, at the end of the first half of the movement the anchor wheel has been caused to rotate in advance of the index housing for a distance equal to one-half of the notch spacing on the anchor wheel. During the remaining or return half of the movement, a similar relative movement occurs, so that the total movement of the anchor wheel is precisely one notch space. To simplify the description, the anchor wheel and cutter C are assumed to have an equal number of notches and teeth respectively; thus it will be apparent that during each indexing movement a new cutter tooth is presented to the grinding wheel.

Figure 9:
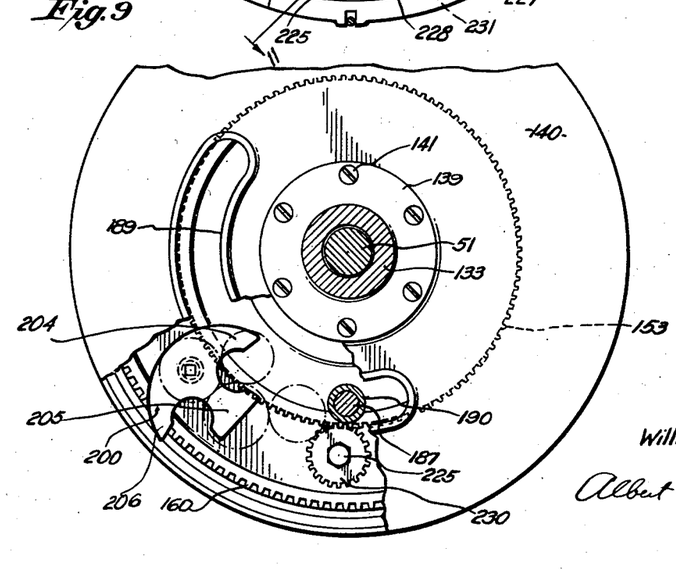
Fig. 9 is a section on the line 9—9 of Fig. 6, constituting a rear view of the index head in the position of Fig. 8.

The actuating means for the indexing transmission 185 consists of a fixed abutment in the form of a bar 187 which is carried in bearings 188 in the pedestal portion 137. In its operative position (dotted lines, Fig. 6) the forward end of the bar is positioned within the housing 140, a suitable arcuate clearance slot 189 being formed in the housing for this purpose (Fig. 9). When automatic indexing is not desired, the bar is moved to an inoperative position (full lines, Fig. 6) by a lever 191 which is carried by a manually operable shaft 192. The end of the lever is formed with a finger 193 which engages in a shouldered portion 194 of the bar. The end of the bar 187 is supplied with a cam roller 190.

Figures 11, 19:
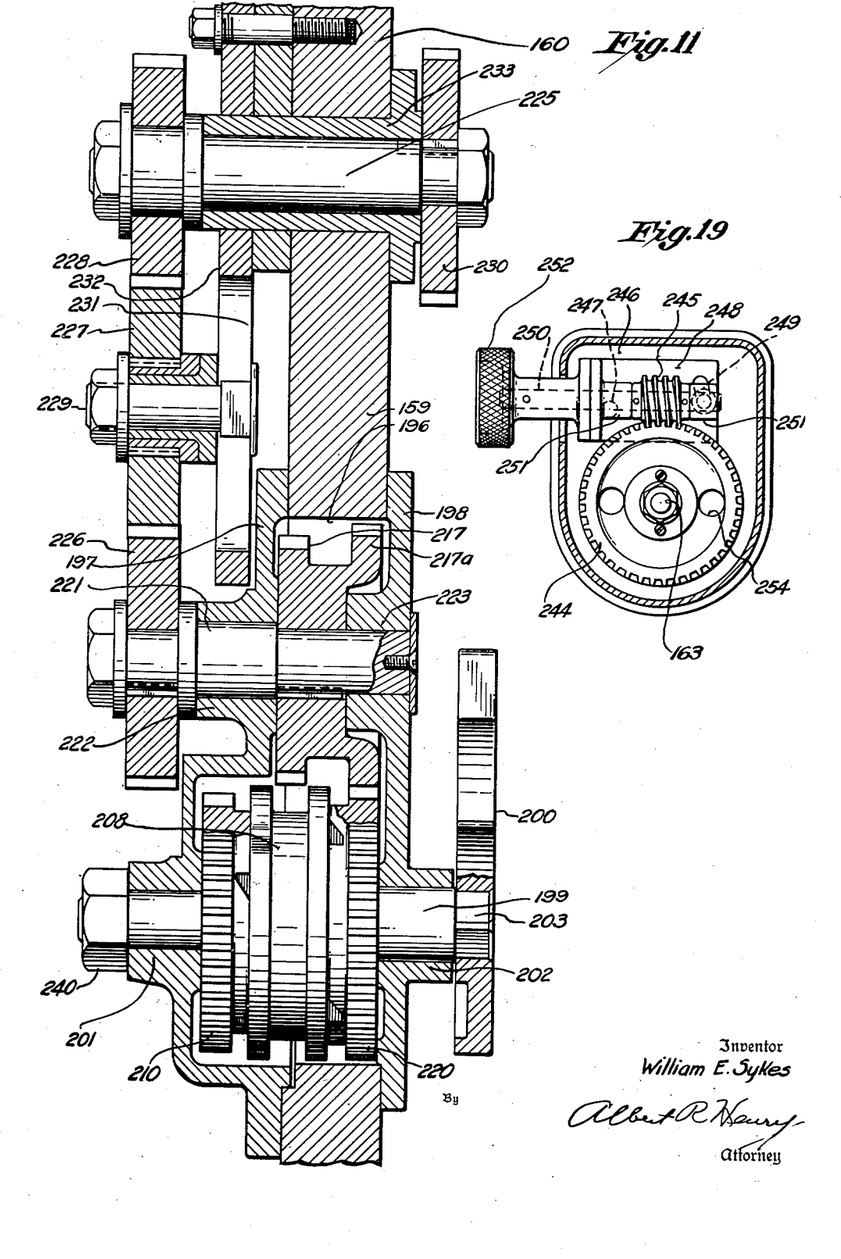
Fig. 11 is an enlarged section on the line 11—11 of Fig. 8.
Fig. 19 is a section on the line 19—19 of Fig. 7.

The worm wheel body 159 is suitably bored to form a transmission housing 196, which is completed by the application of cap plates 197, 198 (Fig. 11). A cam shaft 199 carried in bearings 201, 202 in the cap plates, is formed with a projection 203 to which is secured a tumbler lever or cam 200. The lever is formed with arms or lobes 204, 205, 206, and it is disposed to engage the roller 190 of the bar 187 during oscillation of the housing 140. The housing and accompanying worm wheel 160 are so positioned that when they approach the termination of their counter-clockwise stroke (Figs. 8 and 9), the arm 204 strikes the roller 190 and is rotated until it passes the same. During this rotation the opposing or central arm 205 is brought into a position (Fig. 7) where, on the subsequent return stroke, it strikes the roller 190 to restore the arm 204 to its first position. The arm 206 is not used in the present machine set up, as it is reserved for use in the grinding of right hand cutters, as will be discussed later.

Figure 12:
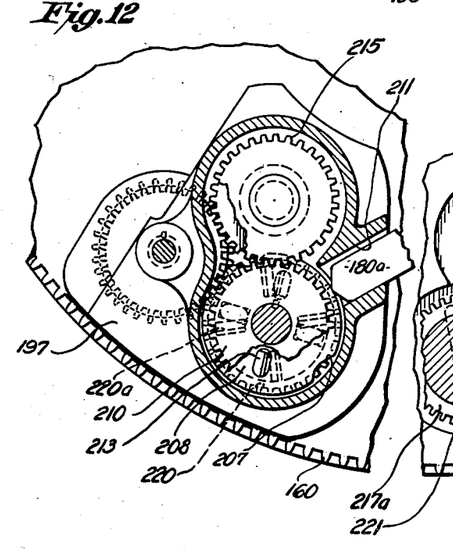
Fig. 12 is a section on the line 12—12 of Fig. 10, showing the reversing transmission and associated mechanism in the phase of indexing movement shown in Fig. 7.
Figure 13:
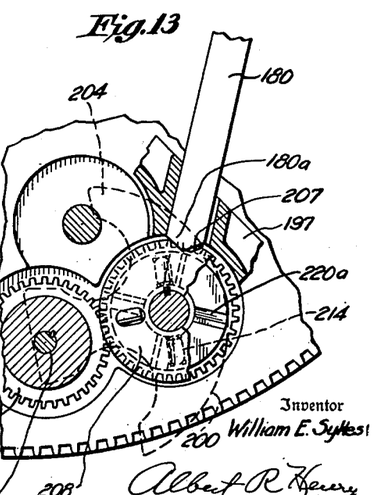
Fig. 13 is a section on the line 13—13 of Fig. 10, showing the locked position of the transmission, which position is maintained after the completion of the indexing movement (as in Fig. 8)

A control disc 208 is keyed to the shaft 199, and it is formed with a flange 209 (Figs. 10 and 15) having a cam notch 207 in which the end 180a of the connecting rod 180 is supported during the non-indexing movement of the housing 140. As the shaft 199 is rotated during the first half of the indexing movement, the rod end is caused to ride on the periphery of the flange 209, and being thus moved outward, it actuates the lever 179 and causes the tooth 170 to be moved out of engagement with the anchor wheel 150. At the termination of the return half of the indexing movement, the rod end is re-positioned in the cam notch, as before. The rod end 180a is guided in a bearing 211 in the cap plate 197, with provision being made for a slight lateral movement therein to prevent binding and to provide a short dwell (Figs. 12 and 13).

Gears 210 and 220 are rotatably carried on the shaft 199 and they are disposed on opposite sides of the control disc 208. The disc is formed to receive spring pressed pawls 213, 214, which are adapted to engage in detents 210a, 220a in the adjacent faces of the gears 210 and 220, respectively (Fig. 15).

Figures 10, 14, 15, 16:
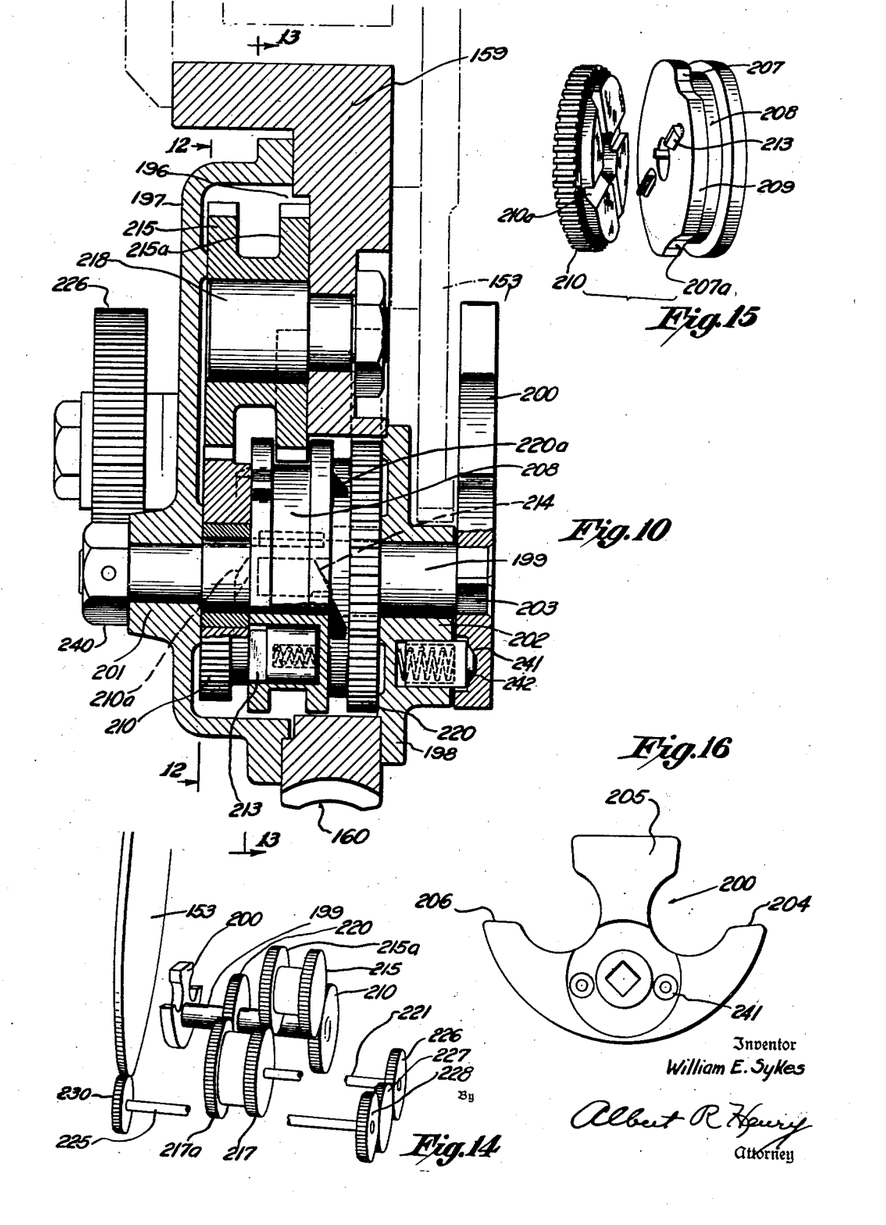
Fig. 10 is an enlarged section on the line 10—10 of Fig. 8.
Fig. 14 is a diagrammatic view of the gear train of the indexing mechanism.
Fig. 15 is a perspective view of the pawl carrier and a clutch gear of the reversing mechanism.
Fig. 16 is an enlarged front view of the indexing tumbler.

The gear 210 meshes with a gear 215, whose integral companion gear 215a meshes with a gear 217 (Figs. 10, 11, and 14). The gear 220 directly meshes with the companion gear 217a of the gear 217. The cluster gear 215, 215a is rotatably carried on a stud 218 secured to the body 159, while the cluster gear 217, 217a is keyed to a shaft 221 which is supported in bearings 222, 223 in the cap plates 197 and 198, respectively.

The shaft 221 is connected to operate a final shaft 225 through a group of change gears consisting of a gear 226 secured to the shaft 221, an intermediate idler gear 227, and a gear 228 secured to the shaft 225. The idler gear 227 is mounted on a stud 229 which is positioned in the slot 231 of an adjustable arm 232.

The final shaft 225 projects through a bushing 233 in the body 159, where a pinion 230 is keyed to it. This pinion meshes with the large gear 153 which forms part of the work spindle assembly (Figs. 9, 11, 14), thus providing a driving connection through which differential movement between casing and spindle may be obtained.

The operation of the indexing mechanism is as follows: The drum and work spindle assemblies are united by the connection between the tooth 170 and anchor wheel 150, so that they rotate as one during a major portion of the oscillation of the drum. When they approach the end of their clockwise movement, however, the tumbler lever strikes the stationary roller 190 of the bar 187 and is rotated. During the first phase of rotation, the connecting rod 180 is forced out of its cam notch 207, thus disengaging the tooth 170 from the anchor wheel 150. Further rotation of the cam shaft brings the pawls 213 of the control disc 208 into engagement with the detents 210a of the gear 210 which, being thus driven, transmits movement through the cluster gear 215, change gears 226, 227, 228, and the drive pinion 230, to the large gear 153. The gears are properly chosen so that the large gear 153 and accompanying anchor wheel 150 are rotated in advance of the housing 140 an angular distance equal to one-half of the circular pitch of the notches 150a of the anchor wheel (Figs. 7 and 12).

Shortly after the tumbler lever is rotated to its full extent, the housing 140 arrives at the end of its clockwise stroke and immediately starts its counter-clockwise stroke. The tumbler lever, which is now positioned with its central arm 205 disposed nearly radially (Fig. 7), again engages the cam roller of the fixed bar 187. The lever is thus turned in passing, and it is restored to the position of Fig. 9. Its direction of rotation, however, is opposite to that in the previously described movement, so that the shaft 199 and accompanying control disc 208 are rotated counter-clockwise. During this movement, the pawls 214 engage in the detents 220a of the gear 220. The formerly operative pawls 213 are, of course, ineffective during this movement, and simply ride past their detents.

The gear 220, being thus driven, transmits movement directly to the cluster gear 217 (Figs. 12 and 13) which, through the change gear train, causes rotation of the final shaft 225 and drive pinion 230 in the same direction as they were rotated during the described first movement. The large gear 153 of the work spindle is thus rotated clockwise relative to the housing 140 for an angular distance equal to the remaining half of the circular pitch of the notches 150a. At this time, the connecting rod end re-centers the cam notch 207, and the tooth 170 is accordingly caused to drop into the newly presented notch in the anchor wheel 150.

It will now be obvious that a complete indexing movement occurs each time the main carriage 30 completes its cycle. Thus, as the grinding wheel G moves to the right out of grinding contact with a tooth of the cutter C, the indexing mechanism is set in motion, and, as the carriage 30 approaches the right hand limit of travel, one half of the indexing cycle is completed. As the carriage returns, the remaining half of the indexing is accomplished, and the work spindle and drum assemblies are locked for common movement. By this action, the face of a new tooth is presented which, immediately after the locking action, is engaged by the wheel G. The face of this tooth is progressively ground as the carriage moves to its left hand limit of travel, where the wheel and tooth are temporarily disengaged and immediately reengaged during the return movement of the carriage, when the same face of the tooth is ground for a second time in a finish operation.

It will be understood that in this series of progressive operations, only the right hand or obtuse sides of the helical teeth are ground. To grind the opposite or acute sides of the teeth, it has been found preferable to remove the work piece from the work spindle and to turn it about and secure it to the spindle with the cutting face F facing the indexing unit. The grinding wheel G is now mounted on the grinding spindle 121a, and then it is positioned through the adjusting mechanisms into correct contact with the teeth of the work piece or cutter C for operation as before.

*Adjustments*

In the grinding of right hand cutters or gears, it is preferred that the indexing movement occur at the end of the counter-clockwise movement of the housing 140. For this purpose, the tumbler lever 200 is turned approximately 160 degrees, so that the arm 206, rather than the arm 205, is presented to the abutment roller 190. The cam shaft is provided with a hexagonal collar 240 (Figs. 10 and 16) for this adjustment, and in addition the lever 200 is formed with detents 241 for receiving a spring pressed plunger 242 which is carried in the adjoining portion of the cap plate 198. The detents 241 are located to receive the plunger, and thus to permit the operator to find the correct positions of the cam lever during adjustment. A second cam notch 207a is formed in the control disc 208 to provide actuating means for the connecting rod 180 in the now changed position of the control disc.

Figure 8:
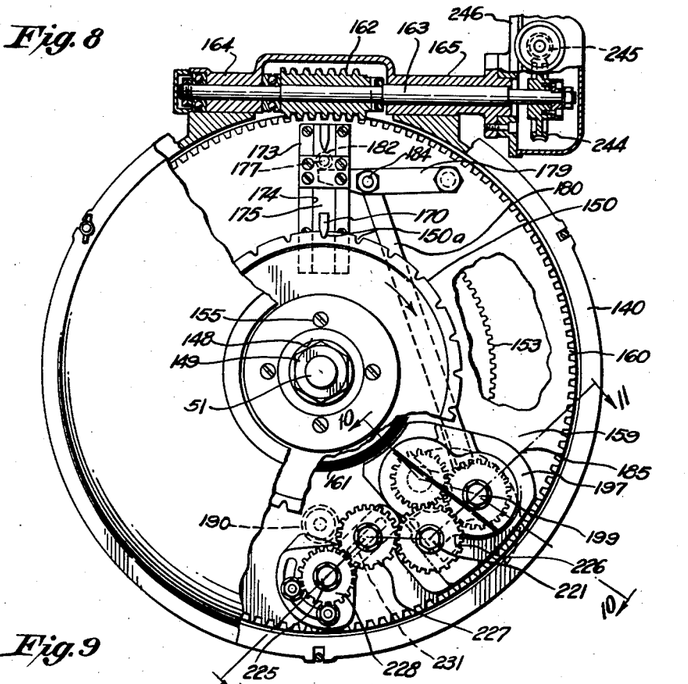

The more exacting adjustment of bringing the cutting wheel into the desired cutting contact with the work is controlled independently of the described wheel positioning mechanisms by means of the adjusting worm 162 (Figs. 8 and 19). The worm shaft 163 projects through the bearing 165, where it receives a small worm wheel 244 which meshes with a worm 245 mounted in suitable bearings. An adapter plate 246 is removably secured to the bearing 165, and it carries a stud 247 on which one end of a bearing bracket 248 is mounted for swinging movement. The remaining end of the bracket is slotted to receive a clamping screw 249. The bearing bracket is formed with bearings 251 which receive the shaft 250 of the worm 245.

A knurled handle 252, secured to the shaft 250, is adapted to be manually rotated to operate the reduction gear train for slight rotation of the worm 162 and the corresponding advance of the large worm wheel 150 relative to its housing 140. This, of course, directly causes the tooth of the work piece to be brought into closer or more remote contact with the grinding wheel G. The movement through the worm 245 and worm wheel 244 provides a very fine adjustment of the wheel to the work, and it is not desirable when a rougher and more rapid adjustment is indicated. In this case, the bearing bracket 248 is swivelled about the stud 247 to disengage the worm 245 from the wheel 244, and application of a suitable crank in the holes 254 of the wheel then permits direct actuation of the shaft 163.

It will be apparent that the construction of the adjusting mechanism for the worm 162 provided in the adapter plate 246 also permits of rapid hand indexing without interfering with the parts contained within the housing 140, beyond, of course, the simple withdrawal of the bar 187 to render the automatic indexing mechanism inoperative.

The diameter of the drum 52 should be equal to the diameter of the base circle of the work piece C, to form perfect involute teeth. Different work pieces will therefore require different drums, which may be readily applied or removed by virtue of the provision of the slot 130. When a new drum is applied, the bands 61, 62 are repositioned and tensioned in the slotted pedestals 57, 58 to be parallel with the ways of the carriage 30, thereby maintaining a constant angle of contact with the drum as the carriage reciprocates.

In practical use of the present invention, it has been found that not only may gears and cutters of ordinary size be finished with a high degree of accuracy, but that cutters for extremely large gears (and therefore the gears themselves) may be finished within tolerances which have heretofore been attained only in smaller gears.

It will also be understood that while a single embodiment of the invention has been described in detail, those skilled in the art may resort to various modifications without departing from the spirit thereof as set forth in the following claims.

I claim:

1. In a machine of the character described, a relatively rotatable work holding spindle and an index casing mounted in coaxial relation, an indexing mechanism comprising means for imparting oscillatory movement to the casing, means connecting the casing and spindle for unitary oscillation, control means for said connecting means for disconnecting the casing and spindle, actuating means for the control means carried by the casing and being operable during minor sectors of movement in opposite directions at one end of the oscillatory stroke of the casing, and a driving transmission for said spindle operated by and during operation of said control means.

2. In a machine of the character described, a relatively rotatable work holding spindle and an index casing mounted in coaxial relation, means for oscillating the casing, indexing means connecting the casing and spindle for a major portion of the oscillatory stroke of the casing, and means associated with the indexing means for causing a movement of the spindle relative to the casing, said last named means including a driving connection between the casing and spindle, actuating means for the connection, and fixed means engageable to move the actuating means during minor sectors of movement in opposite directions at one end of the oscillatory stroke of the casing.

3. In a machine of the character described, a relatively rotatable work holding spindle and an index casing mounted in coaxial relation, means for imparting oscillatory movement to the casing, indexing means including a transmission connecting the casing and spindle for differential movement, cam means connected to operate the transmission, fixed means engageable with the cam means during minor sectors of movement in opposite directions at one end of the oscillatory stroke of the casing, and means controlled by said transmission for connecting the casing and spindle for unitary movement during the remainder of the oscillatory cycle of movement of the casing.

4. In a machine of the character described, a relatively rotatable work holding spindle and an index casing mounted in coaxial relation, means for imparting oscillatory movement to the casing, a driving connection between the spindle and casing, a pair of operating mechanisms for the driving connection, said mechanisms being operable in opposite directions to drive the spindle in one direction relative to the casing through said driving connection, a rotatable clutch mechanism on the casing provided with means for engaging one mechanism when rotated in one direction and the remaining mechanism when operated in the opposite direction, a cam connected to the clutch mechanism, fixed means engageable with the cam during minor sectors of movement in opposite directions at one end of the oscillatory stroke of the casing, and means controlled by the clutch mechanism for locking the casing and spindle for unitary movement during the remainder of the oscillatory cycle of movement of the casing.

5. In a machine of the character described, a relatively rotatable work holding spindle and an index casing mounted in coaxial relation, means for imparting oscillatory movement to the casing, indexing means including a transmission connecting the casing and spindle for differential movement, a cam connected to operate the transmission and formed with opposed lobes, fixed means alternately engageable with the lobes of the cam during minor sectors of movement in opposite directions at one end of the oscillatory stroke of the casing, and means controlled by said transmission for connecting the casing and spindle for unitary movement during the remainder of the oscillatory cycle of movement of the casing.

6. In a machine of the character described, a relatively rotatable work holding spindle and an index casing mounted in coaxial relation, means for imparting oscillatory movement to the casing, a worm wheel mounted axially in the casing, a worm carried by the casing and meshing with the worm wheel, a second worm wheel secured to said worm, an adjustable worm meshing with the second worm wheel, bearing means on the casing supporting the adjusting worm, said means being movable to disengage the adjusting worm to permit direct operation of said first worm, and an indexing mechanism connecting the spindle and index casing.

WILLIAM E. SYKES.